Jan. 3, 1967 A. GAITHER 3,295,268
DRIP MOLDING TRIM
Filed June 22, 1964
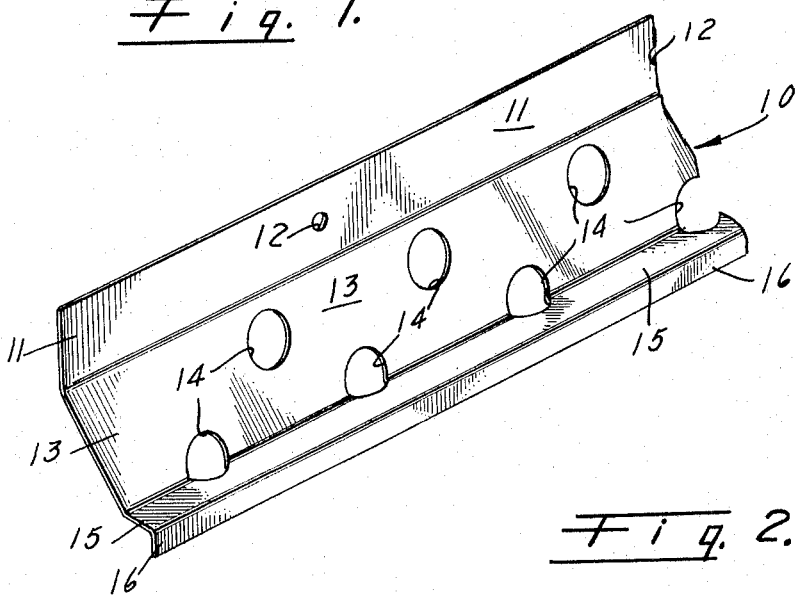
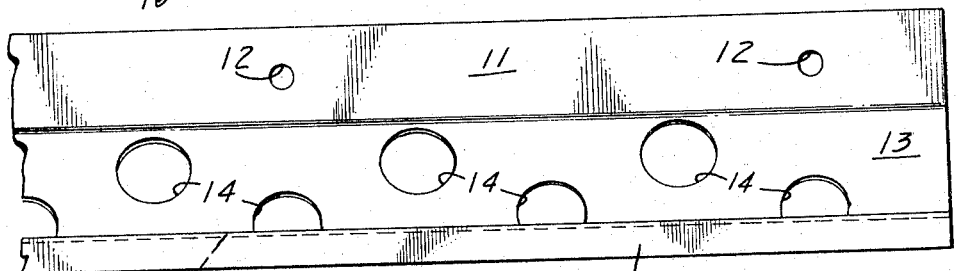
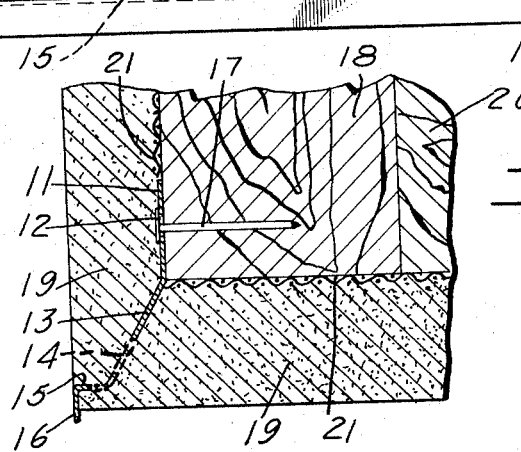
Alva Gaither
INVENTOR.
BY Robert C. Comstock
Attorney

United States Patent Office 3,295,268
Patented Jan. 3, 1967

3,295,268
DRIP MOLDING TRIM
Alva Gaither, Los Angeles, Calif., assignor to H. K. Porter Company, Inc., Los Angeles, Calif., a corporation of Delaware
Filed June 22, 1964, Ser. No. 376,868
2 Claims. (Cl. 52—97)

This invention relates to drip molding trim for use in building construction.

It is an object of my invention to provide a drip molding trim which is an improvement over similar products now on the market and in particular to provide such drip molding trim which is substantially more economical to manufacture and to use.

One of the primary objects of my invention is to provide a drip molding having a plurality of spaced openings therein whereby stucco or the like can pass through the openings and form a bond with stucco on the opposite side of the trim.

Another object of my invention is to provide drip molding having such a simple configuration that it can easily be formed with a minimum number of manufacturing operations from a minimum amount of raw material.

It is a further object of my invention to provide a drip molding trim which has a minimum of exposed metal surface which requires painting, thus providing a saving to the user.

It is also among the objects of my invention to provide drip molding trim having all of the advantages and benefits of the structure set forth above and described in further detail hereinafter in this specification.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

FIG. 1 is a perspective of a length of drip molding trim constructed in accordance with my invention;

FIG. 2 is a front elevational view of the same;

FIG. 3 is a sectional view of the trim in use on the corner of a building structure.

A preferred embodiment which has been selected to illustrate my invention comprises an elongated body member 10, which is preferably formed of suitable material, the most economical and conventional of which is presently galvanized iron. The body member 10 may, however be formed of stainless steel, aluminum or other metal or non-metallic materials.

The body member 10 is bent to form a plurality of adjacent integral sections. The uppermost is a straight section 11, which normally extends in a vertical direction when the trim is in use. The straight section 11 is provided with a plurality of small spaced circular openings 12 for receiving nails or other fastening members which extend into studs, braces or the like to hold the trim in place on the structure.

Beneath the straight section 11 is an angular section 13, which is provided with a plurality of larger spaced circular openings 14, which may also have any other desired shape, configuration and spacing which will achieve the uses and purposes described hereinafter.

Beneath the angular section 13 is a short horizontal section 15, which normally extends in a horizontal direction when the trim is in use. The lower edges of some of the openings 14 overlap and extend into the horizontal section 15.

Beneath the horizontal section 15 is a short lip 16, the outer face of which extends vertically along the outer and lower edge of the structure on which the drip molding is mounted. As shown in FIG. 3 of the drawings, the bottom edge of the lip 16 extends beneath the adjacent stucco, so that moisture will collect along the lip 16 and drip from there to the ground instead of collecting on the stucco.

The drip molding itself is shown in FIGS. 1 and 2 of the drawings, while FIG. 3 shows the drip molding trim in use on a building structure, only a portion of which is shown. In use, this would represents the outer and lower corner edge of any portion of a building structure. The vertical and horizontal relationships shown in FIG. 3 are those which exist when the trim is in use.

As shown in FIG. 3, the body member 10 of the trim is held in place by a plurality of fastening members which may comprise nails 17 which are driven through the small circular openings 12 in the straight section 11 of the body member 10. The shanks of the nails 17 extend into a wood member 18 which forms a part of the building structure. A screen 21 may be used along the wood member 18 to help in holding the stucco 19, which is applied to both the horizontal and vertical surfaces of the wood member 18 and the adjacent wood member 20.

The stucco 19 forms a right angle, completely enclosing the body member 10 except for a portion of the lip 16. The outer surface of the lip 16 is completely exposed along the outside lower edge of the stucco corner, while part of the inner surface of the lip 16 is enclosed by the horizontally directed portion of the stucco 19. The bottom edge of the lip 16 protrudes beneath the horizontally directed portion of the stucco 19 and acts as a drip member to facilitate the collection and disposal of moisture from the stucco.

It should be noted that, as indicated by the dotted lines in FIG. 3, the stucco 19 extends completely through the larger circular openings 14 in the angular section 13 of the body member 10. The two right angularly disposed sections of the stucco 19 are thus bonded to each other through the body member 10. This bonding acts to hold the stucco 19 permanently and firmly in place.

In manufacturing the drip molding trim of my invention, conventional sheet stock material can be used and the trim can be completely formed in only two manufacturing operations, one to cut the openings and one to bend the body member into the desired configuration. It is even possible that these two operations might be combined into a single operation.

As mentioned previously, it is not essential that the openings 14 be circular or that they be arranged in the particular configuration shown in the drawings. The openings mays be square, oval, diamond-shaped or most any conceivable configuration, and their arrangement with respect to each other may also be varied as desired. It is essential only that a substantial quantity of stucco pass through the trim in order to form an effective bond between the two adjacent angular sections of stucco which are otherwise completely separated from each other by the trim.

It should be noted that the only portion of the trim which is exposed and requires painting is the entire outside surface of the lip and a part of the inside surface of the lip. This is an extremely small area compared with the exposed area of most types of drip molding trim which are now in use.

While dimensions are, of course, not critical, it may be noted that both sections of stucco customarily have a thickness of ¾" or ⅞" in conventional building techniques now in use, and my trim may be dimensioned so that one size of trim will accommodate either of such thicknesses.

I claim:
1. A drip molding trim comprising an elongated body member, said body member being bent to form a plurality of integral portions, the upper most portion of said body member comprising a straight section extending vertically and secured to a building member, said straight section having a plurality of spaced small openings therein receiving fastening members thereby securing said trim to a building member, said body member having an angular section disposed directly beneath said straight section, said angular section extending downwardly and outwardly from the lower edge of said straight section, said angular section having a plurality of substantially larger circular openings extending therethrough, said body member having a short horizontal section extending horizontally outwardly from the lower edge of said angular section, said body member having a short lip extending vertically downwardly from the outer edge of said horizontal section, said body member being completely enclosed in stucco or the like, except for the entire outer surface of said lip and the bottom edge portion of said lip, which bottom edge portion extends vertically downwardly beneath said stucco, said stucco forming a corner having a pair of right angular sections, the exposed edges of which extend vertically and horizontally, said stucco sections being joined and bonded to each other through said larger circular openings in the angular section of said body member.

2. A drip molding trim comprising an elongated body member, said body member being bent to form a plurality of integral portions, the upper most portion of said body member comprising a straight section extending vertically and secured to a building member, said straight section having a plurality of openings therein receiving fastening members thereby securing said trim to a building member, said body member having an angular section disposed beneath said straight section, said angular section having a plurality of substantially large openings extending therethrough, said body member having a short horizontal section beneath said angular section, said body member having a short vertically extending bottom lip beneath said horizontal section, said body member being completely enclosed in stucco or the like, except for the entire outer surface of said lip and the bottom edge portion of said lip, which bottom edge portion extends vertically downwardly beneath said stucco, said stucco forming a corner having a pair of right angular sections on opposite sides of said body member, the exposed edges of said stucco extending vertically and horizontally, said stucco sections being joined and bonded to each other through said openings in the angular section of said body member.

References Cited by the Examiner

UNITED STATES PATENTS

| | | | |
|---|---|---|---|
| 560,605 | 5/1896 | Union | 52—255 |
| 1,110,369 | 9/1914 | Baguall et al. | 52—255 X |
| 1,624,121 | 4/1927 | Thiem | 52—255 X |
| 1,728,461 | 9/1929 | Wolcott | 52—257 |
| 1,982,104 | 11/1934 | Holdsworth | 52—255 X |
| 2,483,888 | 10/1949 | Danielson | 52—254 X |
| 2,732,045 | 1/1956 | Herlocker | 52—97 |
| 2,922,385 | 1/1960 | Murray | 52—97 X |

FOREIGN PATENTS

| | | |
|---|---|---|
| 1,298,439 | 7/1962 | France. |
| 887,566 | 8/1953 | Germany. |

FRANK L. ABBOTT, *Primary Examiner.*

M. O. WARNECKE, *Assistant Examiner.*